US007496832B2

(12) United States Patent
Chen et al.

(10) Patent No.: US 7,496,832 B2
(45) Date of Patent: Feb. 24, 2009

(54) WEB PAGE RENDERING BASED ON OBJECT MATCHING

(75) Inventors: Yen-Fu Chen, Austin, TX (US); John W. Dunsmoir, Round Rock, TX (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 11/035,252

(22) Filed: Jan. 13, 2005

(65) Prior Publication Data

US 2006/0156216 A1 Jul. 13, 2006

(51) Int. Cl.
*G06F 17/00* (2006.01)

(52) U.S. Cl. .................. 715/222; 715/221; 715/780
(58) Field of Classification Search ......... 715/221–223, 715/205, 780
See application file for complete search history.

(56) References Cited

U.S. PATENT DOCUMENTS

| 5,714,971 | A | * | 2/1998 | Shalit et al. ................. 715/804 |
| 6,115,739 | A | | 9/2000 | Ogawa et al. |
| 6,425,001 | B2 | | 7/2002 | Lo et al. |
| 6,633,913 | B1 | | 10/2003 | Chalstrom et al. |
| 6,886,136 | B1 | * | 4/2005 | Zlotnick et al. ............. 715/780 |
| 6,934,909 | B2 | * | 8/2005 | Tewari ....................... 715/234 |
| 7,000,179 | B2 | * | 2/2006 | Yankovich et al. .......... 715/222 |
| 7,007,232 | B1 | * | 2/2006 | Ross et al. .................. 715/208 |
| 2001/0016856 | A1 | * | 8/2001 | Tsuji et al. .................. 707/505 |
| 2002/0033967 | A1 | | 3/2002 | Liu |
| 2002/0069222 | A1 | * | 6/2002 | McNeely .................... 707/513 |
| 2002/0107882 | A1 | * | 8/2002 | Gorelick et al. .......... 707/500.1 |
| 2002/0124025 | A1 | | 9/2002 | Janakiraman et al. |
| 2003/0120391 | A1 | * | 6/2003 | Saito .......................... 700/264 |
| 2003/0233619 | A1 | * | 12/2003 | Fast ........................... 715/517 |
| 2004/0032428 | A1 | * | 2/2004 | Pilu et al. ................... 345/764 |
| 2004/0068526 | A1 | * | 4/2004 | Singh ......................... 707/203 |
| 2004/0103367 | A1 | * | 5/2004 | Riss et al. ................... 715/506 |
| 2004/0181749 | A1 | * | 9/2004 | Chellapilla et al. .......... 715/505 |
| 2004/0197029 | A1 | * | 10/2004 | Brundage et al. ............ 382/306 |
| 2004/0205530 | A1 | * | 10/2004 | Borg ........................... 715/507 |
| 2004/0205533 | A1 | * | 10/2004 | Lopata et al. ................ 715/507 |
| 2005/0289114 | A1 | * | 12/2005 | Bellamy ......................... 707/2 |
| 2006/0074980 | A1 | * | 4/2006 | Sarkar ...................... 707/104.1 |
| 2006/0093220 | A1 | * | 5/2006 | Chevion et al. .............. 382/190 |

OTHER PUBLICATIONS

Worring, M; et al., "Hyperdocument generation using OCR and icon detection," Proceedings of the Third International Conference on Document Analysis and Recognition (vol. 2) Year of Publication: 1995.*

* cited by examiner

*Primary Examiner*—Stephen S Hong
*Assistant Examiner*—Adam M Queler
(74) *Attorney, Agent, or Firm*—David A. Mims, Jr.; Dillon & Yudell LLP (57) ABSTRACT

A method and system for automatically creating a webpage using a scanned file created from a hard copy. A lookup table correlates a particular text symbol, such as a dollar sign ("$"), to a specific functionality. For example, if a chart in the hard copy has a dollar sign before values in the chart, then the lookup table associates the dollar sign with a pointer to an HTML routine (object) for creating an input box in a webpage. The HTML routines can be used to create new webpages or to modify existing webpages.

1 Claim, 6 Drawing Sheets

Fig. 1

Buyer Option Pricing
March 15, 2004

Buy Your Home

| ELECTRICAL OPTIONS | | Price |
|---|---|---|
| Additional Phone Outlet | each | $ 75.00 |
| Additional Cable Outlet | each | $ 75.00 |
| Additional Outlet | each | $ 75.00 |
| Additional Outlet - GFCI/Dedicated | each | $ 150.00 |
| Additional Ceiling Fan - Globe Light Kit | each | $ 200.00 |
| Additional Ceiling Fan - Tulip Light Kit | each | $ 250.00 |
| Add Standard Recess Can (not to exceed 6 on 1 switch) | each | $ 150.00 |
| Home Office Outlet - ???/Data/TV | each | $ 225.00 |
| Surround Sound Prewire (3 front, 2 rear & subwoofer) | per room | $ 245.00 |
| Additional Pair of Speakers & Volume Control (add surround sound prewire) | per pair | $ 125.00 |
| Surround Sound Trim (prewire included) | | TBD |
| Motion Sensor | each | $ 135.00 |
| Glass Breakage Detector | each | $ 155.00 |
| Video Camera Prewire | each | $ 155.00 |
| BATH OPTIONS | | Price |
| 6' Whirlpool Tub | master only | $ 450.00 |
| Retro 6' Whirlpool Tub | master only | $ 705.00 |
| 42x42 Frameless Shower Enclosure | master only | $ 700.00 |
| Medicine Cabinet - Flat Panel Oak | each | $ 115.00 |
| Medicine Cabinet - Flat Panel Maple | each | $ 150.00 |
| Cabinet over Commode - Flat Panel Oak | each | $ 200.00 |
| Cabinet over Commode - Flat Panel Maple | each | $ 245.00 |

Buyer Satisfaction:   Yes/No

Signature: _______________   Date: _______

| ELECTRICAL OPTIONS | | Price |
|---|---|---|
| Additional Phone Outlet | each | $ 75.00 |
| Additional Cable Outlet | each | $ |
| Additional Outlet | each | $ |
| ... | ... | $ |
| ... | ... | $ |
| BATH OPTIONS | | Price |
| 6' Whirlpool Tub | master only | $ |
| ... | ... | $ |
| Cabinet over Commode - Flat Panel Maple | each | $ |

Buyer Satisfaction: Yes ● No ○

Signature: [        ]  Date: [        ]

WEB PAGE RENDERING BASED ON OBJECT MATCHING

BACKGROUND OF THE INVENTION

1. Technical Field

The present invention relates in general to the field of computers, and in particular to webpages that are accessible to computers via a network such as the World Wide Web. Still more particularly, the present invention relates to a method and system for scanning a hard copy of a document and creating a webpage that has active windows that are defined by the physical appearance of images on the hard copy of the document.

2. Description of the Related Art

In the 1960s, a network was created of academic and military computers that were linked together by packet switching. This network was called the ARPANET, and was the precursor to today's Internet, which connects multi-millions of computers worldwide.

In the early 1990s, a system known as the World Wide Web (WWW) was implemented to afford an efficient system for communicating specially formatted documents over the Internet. The WWW system includes special Internet servers that support documents that are specially formatted in a markup language called HyperText Markup Language (HTML). Documents created using HTML, and identified by a global address on the WWW known as a Uniform Resource Locator (URL), are known as webpages. HTML supports links to other webpages, as well as access to graphics, audio, and video files.

Webpages provide information about products, companies, schools, hobbies, politics, and any other topic of interest to the developer of the webpage. Similarly, webpages are essential in the field of electronic-commerce (e-commerce), in which products can be offered to and/or ordered from any person or computer that has access to a particular webpage.

Webpages, and particularly webpages developed by an enterprise such as a company, school, government agency, etc., are rarely static for long period of time. That is, webpages which populate an enterprise's website (located at a main URL on the WWW) are often updated, added, removed and otherwise modified. Creating such webpages normally requires the talent of one skilled in the field of computer programming, and particularly with HTML programming.

In an effort to make the creation of webpages easier, several procedures have been developed to scan data from a hard copy, and then using the scanned data to populate a webpage. An example of such a procedure is described in U.S. Patent Application Pub. No. US 2002/0124025 A1, filed Sep. 5, 2002 by Janakiraman et al., which is herein incorporated by reference in its entirety.

However, such scanning techniques typically simply export scanned text data (using an Optical Character Recognition—OCR—scanning program) into an HTML document. It would be beneficial and useful for information in the scanned text data to be used to create functionality in the webpage, by automatically creating active windows, input boxes, link buttons, etc.

SUMMARY OF THE INVENTION

The present invention is thus directed to a method and system for automatically creating a webpage using a scanned file created from a hard copy. A lookup table correlates a particular format or symbol, such as a dollar sign ("$"), to a specific functionality. For example, if a chart in the hard copy has a dollar sign before values in the chart, then the lookup table associates the dollar sign with a pointer to an HTML routine (object) for creating an input box in a webpage. The HTML routines can be used to create new webpages or to modify existing webpages.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
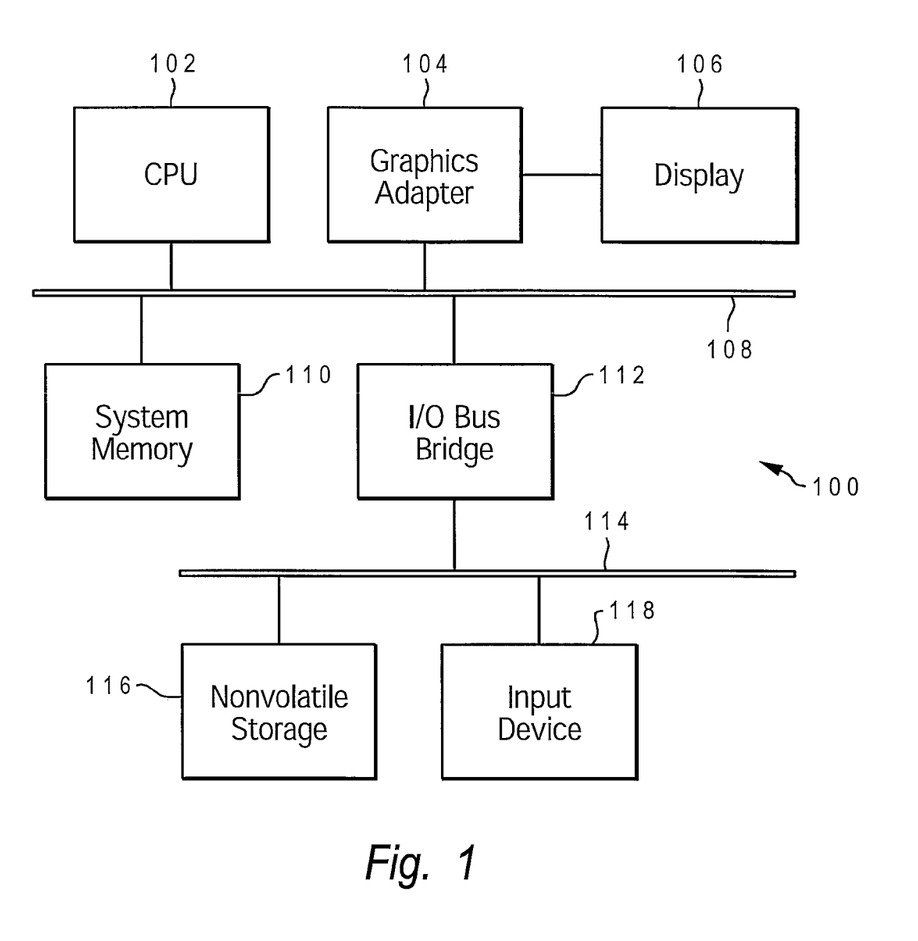
FIG. 1 depicts an exemplary computer system which may be utilized by the present invention to automatically create/modify a webpage.

With reference now to the figures, and particularly to FIG. 1, there is depicted a block diagram of an exemplary data processing system in which a preferred embodiment of the present invention may be implemented. Data processing system 100 may be, for example, one of the models of personal or server computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input devices 118, which may include a conventional mouse, a trackball, or the like, or, especially in the present invention, a scanner, are connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD)

drive, a sound card and audio speakers, and numerous other optional components. All such variations are believed to be within the spirit and scope of the present invention.

Figure 2:
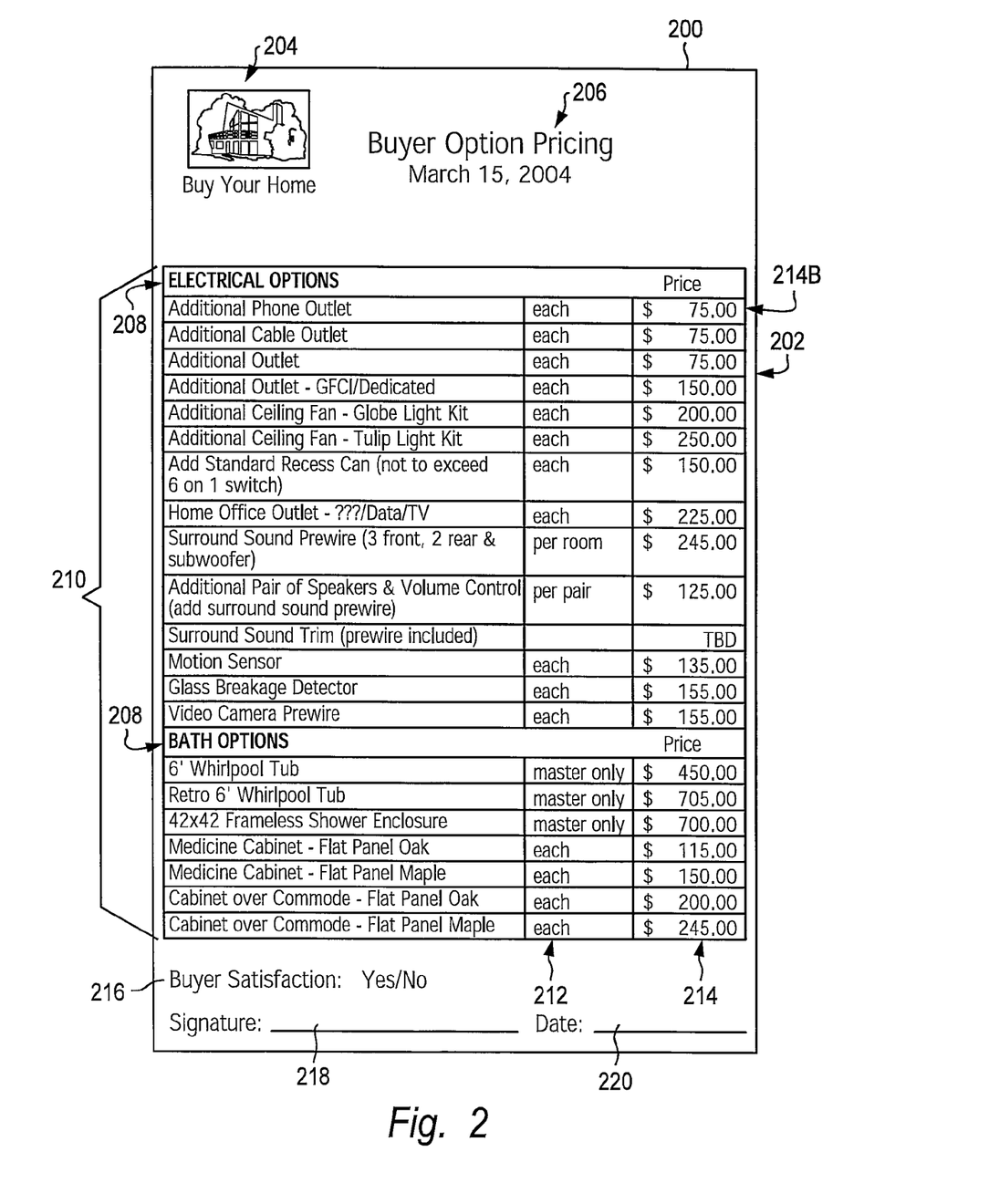
FIG. 2 illustrates an original hard copy of data to be scanned in by the exemplary computer system.

With reference now to FIG. 2, there is depicted a hard copy 200 of exemplary data 202 to be scanned to create a scanned data. Data 202 includes a logo 204, a title 206, column headings 208, product descriptors 210, unit fields 212, price fields 214, a buyer satisfaction survey option 216, a signature line 218, and a date line 220. Note that each of the price fields 214 includes a "$" character in the price field 214. Similarly, buyer satisfaction survey option 216 is shown as a "Yes/No" option, and signature line 218 and date line 220 are underscored areas.

Figure 3A:
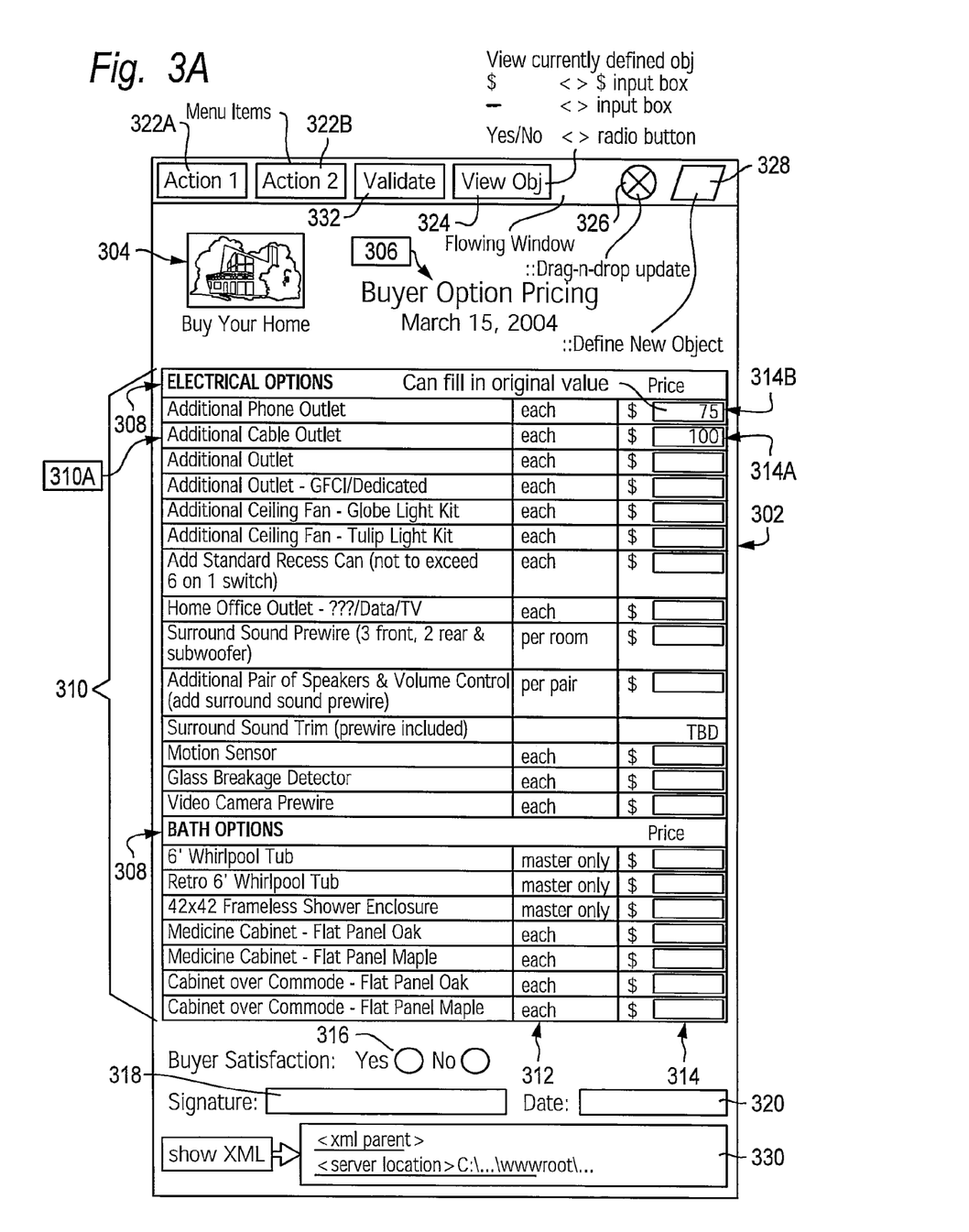
FIG. 3a depicts an intermediate panel, depicted on a Graphical User Interface (GUI), showing scanned in data from the original hard copy, as well as on-screen options for various active windows in the webpage that is being automatically created by the present invention from the scanned in data.

Hard copy 200 is scanned, using any appropriate scanning2web technique that is known to those skilled in the art, including that described in the background description above, and/or any OCR recognition system. As a result of hard copy 200 being scanned, a scanned data identified as an intermediate panel 302 in FIG. 3a is created. Intermediate panel 302 includes a properly positioned rendering of data 202. The rendering includes HTML coded logo 304, title 306, column headings 308, product descriptors 310, and unit fields 312. Logo 304 may be a hot link to a home webpage of the company whose logo is depicted. However, if logo 304 is strictly a graphical (non-functional) figure, then preferably the HTML code (or the XML script associated with the HTML code) for logo 304 has an additional field indicating that it is strictly a non-functional figure in the webpage, such that the non-functional feature is incapable of accepting an input or causing a link to another webpage. This is especially useful in identifying non-text and non-link elements that can be eliminated in cases where a display area is limited (i.e., on a Personal Digital Assistant—PDA) or in accessibility applications in which non-essential information (e.g., a logo) is parsed out.

Note that price fields 214 have now been transformed into price input boxes 314, which are input functions that correspond with price fields 214. Each price input box 314 is an active window capable of receiving input data, which can then be used in an application program, such as a billing program, etc. Thus, an "input function" is a webpage function that accepts an input, either to input data (into an active input field such as price input boxes 314), or to invoke a hot link (such as logo 304) to another webpage.

As will be described in additional detail below, each product descriptor 310 is associated with a specific price input box 314. Furthermore, since product descriptor 310 and other non-input fields are in HTML code, they can be manipulated and/or utilized. For example, product descriptors 310, title 306, column headings 308 and unit fields 312, can use their respectively generated HTML code for translation into a foreign language, to drive a text-to-speech synthesizer, etc. Such translation can be performed either by leveraging existing translation resource bundle files associated with the HTML code, or else a connection can be made to an external translation source and the translation then applied accordingly to the proper field.

Note that each scanned price field 214 has been shown as having data in the field. This data can be used to determine the size of the created price input box 314. For example, if the greatest value in the scanned price field 214 has five numeric characters (e.g., 534.50), then all price input boxes 314 are sized accordingly to accommodate up to this size figure. Alternatively, the size of the input box 314 shown in FIG. 3a may be defined by the size of the cell box shown as price fields 214 in FIG. 2.

Referring again to FIG. 3a, buyer satisfaction option 216 has been converted into a "Yes-No" pair of radio buttons 316, while signature line 218 and date line 220 respectively have been converted into a signature input box 318 and a date input box 320.

Note that while the radio buttons 316 have been created as a result of "Yes-No" fields in the original hard copy 200, analogous radio buttons 316 can be created for other fields, such as alphanumeric fields. For example, consider a hard copy 200 that has choices "A |B |C |D". These may be answers to a test question, a survey, etc. When the objects "A |B |C |D" are scanned in, the present invention recognizes the format of four alphabetically order letters, preferably capitalized and separated by vertical lines, as representing four choices. Four radio buttons 316, each corresponding and preferably labeled according to the A-D choices, are then created.

As stated above, intermediate panel 302 includes product descriptors 310, which correspond with product descriptors 210 shown in FIG. 2. Note that each product descriptor 310 corresponds with a specific price input box 314. Specifically, besides a particular product descriptor 310 visually lining up with a particular price input box 314, each price input box 314 includes script in its HTML code that logically associates that price input box 314 with that particular product descriptor 310. This association permits the price input box 314 to be populated from a remote database.

Figure 3B:
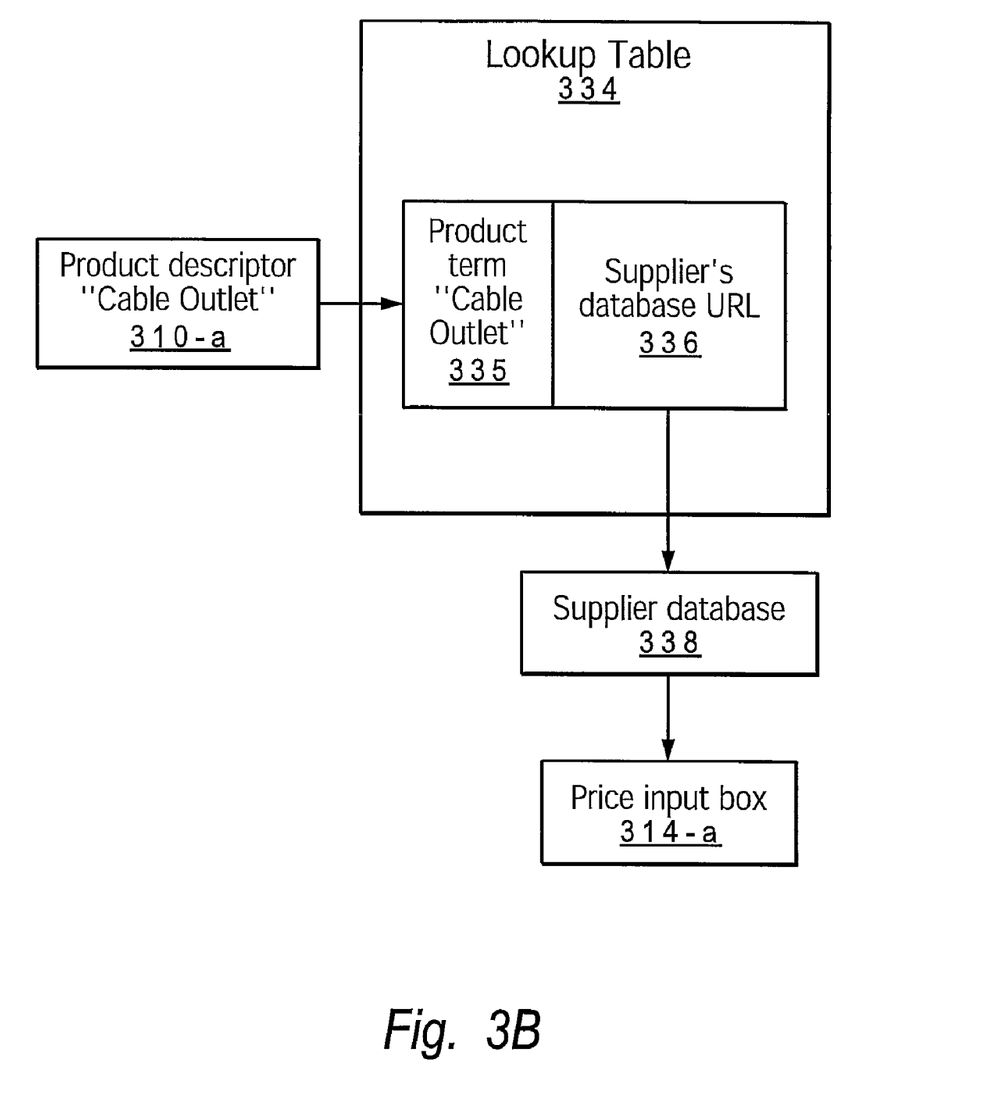
FIG. 3b is a diagram of a relationship between a lookup table and a remote database used to populate an input box in the webpage.

For example, assume that when the product descriptor 310-a in FIG. 3a, labeled "Additional Cable Outlet" is scanned, a lookup table associates a default supplier of "Cable Outlets" with price input box 314-a. For additional detail of this association and population, refer now to FIG. 3b. Product descriptor 310-a, which includes the product term "Cable Outlet," is associated with a lookup table 334. That is, product descriptor 310-a sends a product term "Cable Outlet" 335 to lookup table 334, where product term "Cable Outlet" 335 is associated with a supplier's database Uniform Resource Locator (URL) 336. Supplier's database URL 336 allows lookup table 334 to call a supplier database 338, which then sends the price ($100) of a "Cable Outlet" to price input box 314-a, as shown populated in FIG. 3a.

Alternatively, when hard copy 200 (shown in FIG. 2) is scanned, data in a price field 214 is used to populate a price input box 314. For example, the value "75.00" shown in price field 214-b in FIG. 2 is captured in the scanning process, and is then used to populate price input box 314-b with the value "75.00".

Referring again to FIG. 3a, intermediate panel 302 also includes other active areas for use in modifying and/or accepting the format of the active input fields. For example, action buttons 322 may be predefined to performs actions such as changing an input window type (action button 322a) or resizing an input box (action button 322b). Thus, suppose that a user, who is creating a webpage using intermediate panel 302, prefers to change radio buttons 316 (which allow only a YES or NO response) to a single input box (in which anything can be typed, including YES, NO, DON'T CARE, LATER, etc.). In an exemplary preferred embodiment, action button 322a and a view object button 324 are both clicked (preferably by holding down a "Shift" or "Control" key while clicking each button). By clicking the view objects button 324, a drop-down menu of all currently defined objects available for use in intermediate panel 302 is shown. The user then simply drags and drops the desired object (e.g., either input box shown) to the active field where radio buttons 316 are currently populating the GUI showing intermediate panel 302. Dropping the new input box causes the radio buttons 316 to be removed, and replaced with the new input box in the location that the radio buttons 316 previously occupied.

Likewise, action button 322b could be programmed for manually resizing an input box. Thus, after clicking action button 322b, a cursor (not shown) can be positioned near an input box such as signature input box 318, and the selected box simply pulled wider, narrower, taller, or shorter by movement of the cursor on the input box.

There may be occasions in which the drag-n-drop options shown by the view object button 324 are inadequate. If so, then additional options can be added by clicking a drag-n-drop update button 326, which results in a display of more input object options, including hot links to other webpages, etc. Clicking the drag-n-drop update button 326 results in a drop-down menu (not shown) of new input options, which can then be dragged either directly into scanned data shown in intermediate panel 302 as described above using the view object button 324, or else the new input option(s) can be dragged into the view object button 324 field for future use.

There may also be times in which a desired input option has not been created/defined yet, and thus it is neither available through the view object button 324 nor the drag-n-drop update button 326. In this case, a new input option can be defined by clicking a define new object button 328.

A script window 330 is always open on intermediate panel 302. This window shows script, preferably eXtended Markup Language (XML) script, which is used to create HTML input functions. Thus, when a cursor is placed over one of the objects shown in the drop down menu below the view object button 324 or the drag-n-drop update button 326, the XML script associated with that object appears in the script window 330. Likewise, when a new input object is being defined (by clicking the define new object button 328), script window 330 is a source code scratchpad, from which source code can be compiled to create the new input object. Similarly, existing input objects (those found in the drop down menu below the view object button 324 or the drag-n-drop update button 326) can be modified on-the-fly through the script window 330.

When the intermediate panel 302 is in a desired format, the user then clicks a validate button 332. Validate button 332 populates each input field in intermediate panel 302, and then sends that data to a test bench program. The test bench program is preferably an Application Program Interface (API) that mimics different applications that will be using the input data. The programs being mimicked include, but are not limited to, billing programs, ordering systems, inventory control programs, customer satisfaction surveys, and/or an integrated package of one or more of these programs. If the test bench program functions properly, then it can be assumed that each input field is properly associated with a particular field (e.g., total cost matches with a specified quantity of a particular item) and is in the proper format (e.g., an input box, not a YES/NO radio button, is associated with a signature field). If the validation process is unsuccessful, then an error message appears in intermediate panel 302.

Figure 4:
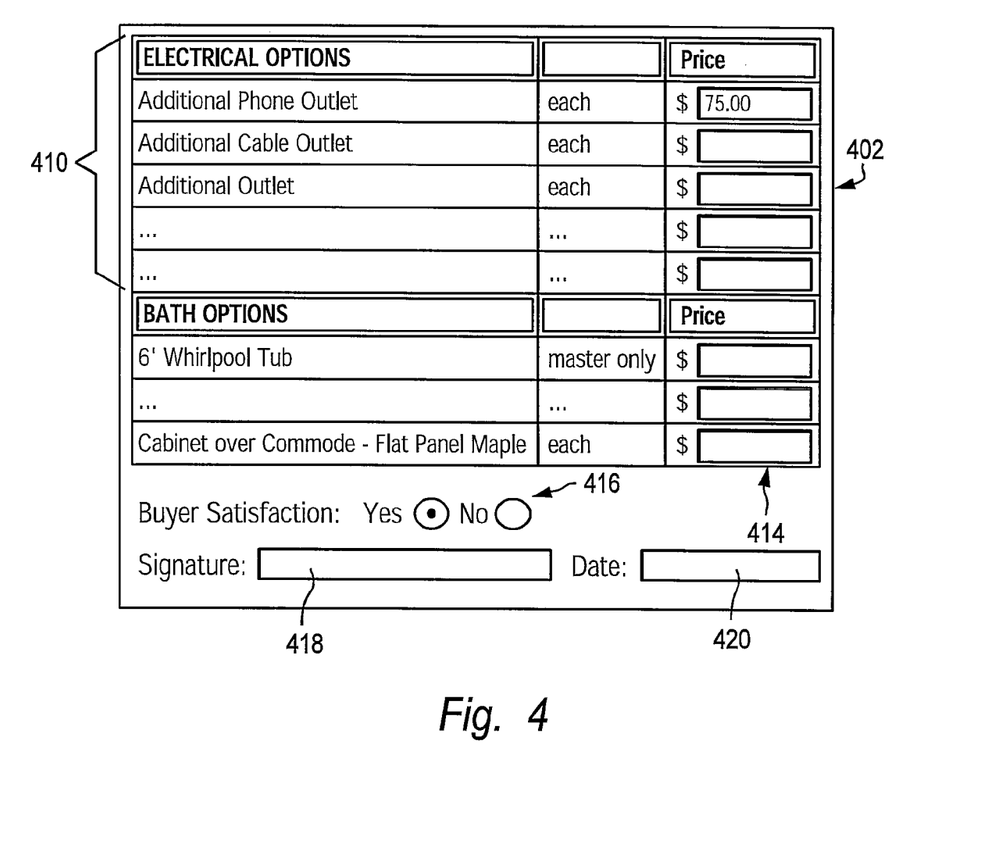
FIG. 4 illustrates a portion of the completed webpage.

If the validation process is successful, then a fully rendered HTML webpage is created. A portion of this webpage is shown in FIG. 4 as a rendered HTML based webpage 402. As seen, price fields 414 are properly aligned with corresponding product descriptors 410, and radio buttons 416, signature field 418, and date field 420 are oriented relative to each other as are their corresponding features shown in FIG. 2.

Figure 5:
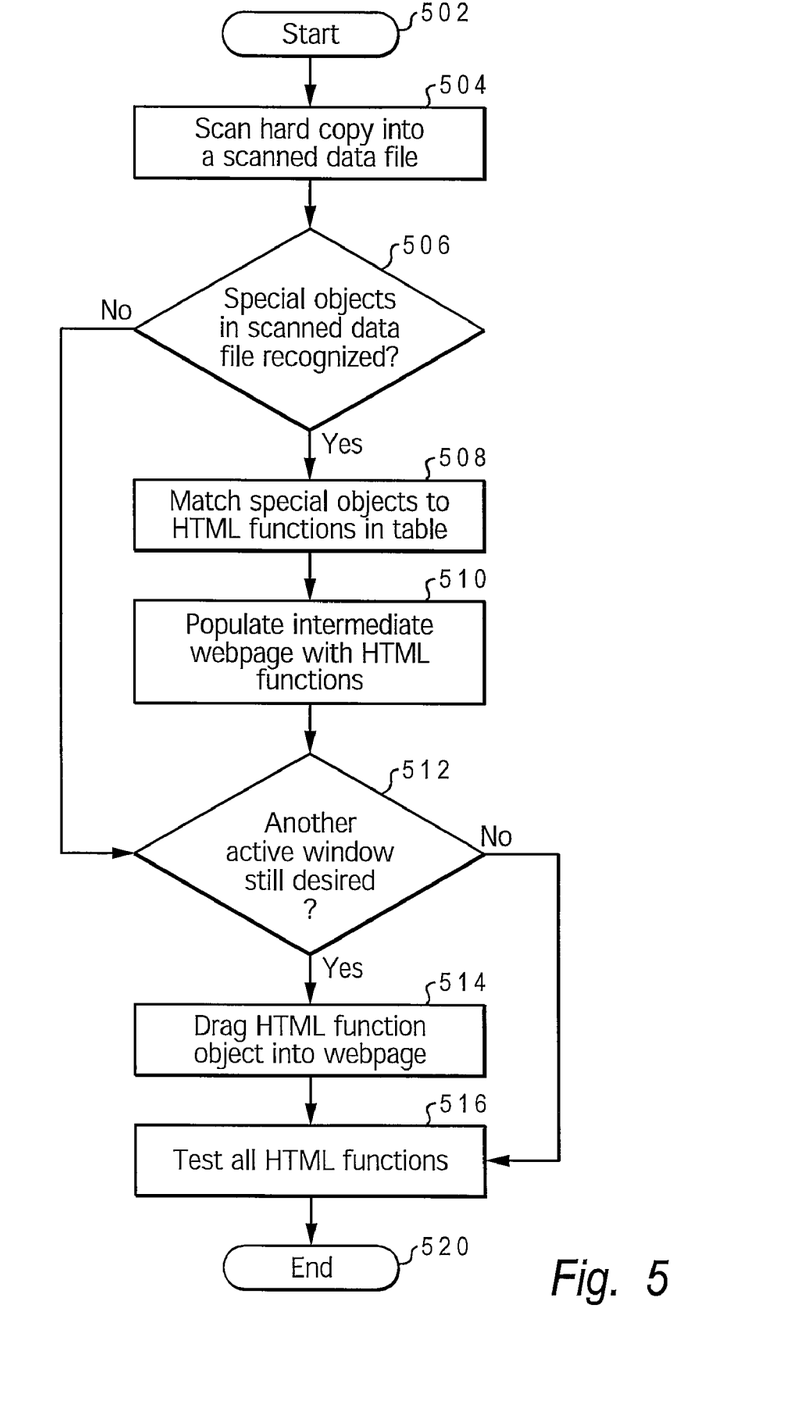
FIG. 5 is a flow-chart of steps taken in a preferred embodiment of the present invention.

With reference now to FIG. 5, a flow chart of steps taken in an exemplary embodiment of the present invention is illustrated. After initiator block 502, a hard copy form is scanned into a scanned data file (block 504). A query (query block 506) is then made by the scanning program to determine if there are any special predetermined objects in the scanned data. A predetermined object may be a symbol (e.g., "$", "#", "*", etc.), character (e.g., "A", "3", etc.), font (e.g., Ariel, Pica, New Times Roman, etc.), font style (e.g., bold, italics, etc.), underscore (i.e., underlined), geometric shape (e.g., a box, rectangle, circle, etc.) or other similar object. That is, a predetermined object is defined as a predefined character (e.g., a letter, number or other symbol), an appearance of that character (i.e., font, shape, color or other physical attribute of the rendered character), a geometric shape (e.g., a box, line circle, etc.), or any combination of characters, character appearance and geometric shape.

Referring again to FIG. 5, once special predefined objects are recognized in the scanned data, they are matched (block 508) in a lookup table containing both the predefined objects and corresponding HTML functions. For example, if a "$" is recognized in the scanned data, then the table points to an HTML function for an input box, which is then used to populate (block 510) the new webpage next to the position where the "$" was positioned in the original hard copy that was scanned.

After all of the HTML functions populate the webpage using the predefined scanned objects and the lookup table, a query is made as to whether additional active fields are desired for the new webpage (query block 512). If so, then new HTML functions are dragged (block 514) into the intermediate panel 302 using the view object button 324, drag-n-drop update button 326, and/or the define new object button 328 as described above. Similarly, an HTML function object can be dragged into intermediate panel 302 if the scanning process (described in block 504) erroneously misses a predefined scanned object or fails to convert the scanned object into a requisite HTML function.

If a same object type is repeatedly added or changed, a heuristic feature can be added, such that future scan-2-webpage activities will use the changed feature instead of the originally pre-programmed feature. That is, if the scanning program recognizes a "$" as a call for an input box, but the user repeatedly changes the input box to a radio button, then in future scans a radio button will be used instead of an input box.

All HTML functions (all input fields) are then tested (block 516), making corrections if necessary (by changing either the type of input field or by modifying the XML code directly as described above). Input fields are populated as described above. Furthermore, testing is performed using erroneous data for validation. That is, certain input fields may be defined as being allowed to only accept numeric characters. If a letter character is entered, then Java Script validation creates an error message (both in the intermediate panel 302 shown in FIG. 3a as well as on the final webpage 402 shown in FIG. 4) is displayed indicating that the type (e.g., number versus letter) or format (e.g., date not being in day/month/year format), etc. is erroneous. Other formatted fields (and their hard copy objects) may be used. A "$" symbol in the hard copy will result in only numbers being accepted in the generated active field. The word "signature" with an underscore will create an active field that only accepts alphabetical text characters. A "*" in the hard copy will result in the generated active field being a required field, or else an error message will be returned in that field is left blank. Upon completion of the testing, the process ends (terminator block 520).

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention therefore provides a useful means for creating a webpage that has active input fields that correspond to an original form, such as an order form, an employment or loan application, a billing form, etc. Preferably, the webpage will be very similar in appearance to the original hard copy form, to include like renderings of color, shading, layout, etc.

While the invention has been particularly shown and described with reference to a preferred embodiment, it will be understood by those skilled in the art that various changes in form and detail may be made therein without departing from the spirit and scope of the invention.

What is claimed is:

1. A method, comprising:

scanning a hard copy of data to create scanned data;

detecting a first predetermined object in the scanned data such that the first predetermined object is a non-alphabetic symbol in a specific font within a predefined geometric shape and such that the non-alphabetic symbol invokes a creation of an active input field in a webpage and the first predetermined object is in a font style that is applied to a string of characters to be used as input data in the active input field and upon detecting the first predetermined object in the scanned data the active input field is created in the webpage such that it corresponds with the first predetermined object in the scanned data;

mapping in a lookup table a detected first predetermined object in the scanned data to a pointer to a Hyper Text Markup Language (HTML) routine that creates the active input field in the webpage;

replacing an old input function in the webpage with a new input function by dropping the new input function into an area on the webpage in which the old input function previously occupied such that the new input function is enabled by the created active input field;

in response to a failure of replacing the old input function with a new input function in the webpage that corresponds with the first predetermined object in the scanned data, adding a new input function to the webpage by dragging an icon representing the new input function from a drop-down menu into an intermediate panel representing the webpage;

modifying the new input function by amending an eXtensible Markup Language (XML) code associated with the new input function, such that the XML code defines the new input function, in a script window located in an intermediate panel such that the intermediate panel depicts an intermediate HTML rendering of the webpage;

populating the data input field with data from a remote database such that the remote database is accessed according to information from a descriptor field in the scanned data that associates the first predetermined object in the scanned data with the data input field; and detecting a second predetermined object in the scanned data such that the second predetermined object is an object that creates in the webpage a non-active field such that the non-active field is incapable of accepting any data input.

* * * * *